(12) United States Patent
Cho et al.

(10) Patent No.: US 9,988,961 B2
(45) Date of Patent: Jun. 5, 2018

(54) SYSTEM AND METHOD OF PURIFYING EXHAUST GAS

(71) Applicant: Hyundai Motor Company, Seoul (KR)

(72) Inventors: Ji Ho Cho, Whasung-Si (KR); Jong Hag Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 42 days.

(21) Appl. No.: 15/342,012

(22) Filed: Nov. 2, 2016

(65) Prior Publication Data

US 2018/0023440 A1    Jan. 25, 2018

(30) Foreign Application Priority Data

Jul. 25, 2016   (KR) .......................... 10-2016-0094295

(51) Int. Cl.
*F01N 3/20* (2006.01)
*F01N 3/021* (2006.01)
*F02M 26/06* (2016.01)

(52) U.S. Cl.
CPC ............ *F01N 3/208* (2013.01); *F01N 3/021* (2013.01); *F02M 26/06* (2016.02); *F01N 2610/02* (2013.01); *F01N 2900/1602* (2013.01); *F01N 2900/1616* (2013.01)

(58) Field of Classification Search
CPC ...... F01N 3/206; F01N 3/208; F01N 2610/02; F01N 2900/1616; F02M 26/06
See application file for complete search history.

(56) References Cited

U.S. PATENT DOCUMENTS

2015/0143798 A1* 5/2015 Lee .................... F02D 41/1446
                                                              60/274
2017/0175683 A1* 6/2017 Lim ...................... F02M 26/15

FOREIGN PATENT DOCUMENTS

KR   10-2014-0083120 A   7/2014
KR   10-2015-0059535 A   6/2015

* cited by examiner

*Primary Examiner* — Jonathan Matthias
(74) *Attorney, Agent, or Firm* — Morgan, Lewis & Bockius LLP

(57) ABSTRACT

A method of purifying exhaust gas may include predicting a slip probability of ammonia (NH3) to a rear end of a selective catalytic reduction on diesel particulate filter (SDPF), comparing the predicted ammonia slip probability with a slip probability of ammonia limiting operation of a low pressure-exhaust gas recirculation (LP-EGR) system, comparing an absorption amount of ammonia with a value obtained by multiplying an ammonia absorption target amount by a minimum target absorption amount ratio when the predicted ammonia slip probability is larger than the slip probability of ammonia limiting operation of the LP-EGR system, limiting the operation of the LP-EGR when the absorption amount of ammonia is not larger than the value obtained by multiplying an ammonia absorption target amount by a minimum target absorption amount ratio, and dosing a urea solution.

12 Claims, 3 Drawing Sheets

SYSTEM AND METHOD OF PURIFYING EXHAUST GAS

CROSS-REFERENCE TO RELATED APPLICATION

The present application claims priority to Korean Patent Application No. 10-2016-0094295, filed Jul. 25, 2016, the entire contents of which is incorporated herein or all purposes by this reference.

BACKGROUND OF THE INVENTION

Field of the Invention

The present invention relates to a system and a method of purifying exhaust gas. More particularly, the present invention relates to a system and a method of purifying exhaust gas which adjusts dosing of urea solution by predicting ammonia inflow.

Description of Related Art

In general, to reduce carbon monoxide (CO), hydrocarbon (HC), particulate matter (PM), nitrogen oxide (NOx), etc. as a pollution material contained in an exhaust gas, an exhaust system of an engine includes an exhaust gas post-treatment device such as a diesel oxidation catalyst (DOC) device, a diesel particulate matter filter (DPF), a selective catalytic reduction (SCR) device, and a nitrogen oxide storage catalyst (Lean NOx Trap, LNT catalytic) device, etc.

The nitrogen oxide storage catalyst device traps and stores nitrogen oxide generated by lean combustion, reduces nitrogen oxide to nitrogen and exhausts nitrogen, and SDPF is formed such that SCR is coated to a high pore diesel particulate matter filter. Further, the SCR device may reduce nitrogen oxide of exhaust gas penetrated through SDPF.

Meanwhile, an exhaust gas recirculation (EGR) system is used for reducing nitrogen oxide. The EGR system is mounted on an exhaust pipe to supply again some of exhaust gas exhausted from the engine through the EGR system. For applying a compound system having a particulate matter filter stable reducing nitrogen oxide and particulate matter exhausted from the vehicle and EGR system, means of exact measurement and expectation of ammonia recirculating in the EGR system is necessary, but instead this, integration control of nitrogen oxide purification through measurement and expectation of ammonia exhausted from rear end of the SDPF is necessary.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method and a system purifying exhaust gas having a selective catalytic reduction on diesel particulate filter (SDPF) and measuring and predicting ammonia amount exhausted the SDPF.

According to various aspects of the present invention, a method of purifying exhaust gas may include predicting, by a controller, a slip probability of ammonia (NH3) to a rear end of a selective catalytic reduction on diesel particulate filter (SDPF), comparing, by the controller, the predicted ammonia slip probability with a slip probability of ammonia limiting operation of a low pressure-exhaust gas recirculation (LP-EGR) system, comparing, by the controller, an absorption amount of ammonia with a value obtained by multiplying an ammonia absorption target amount by a minimum target absorption amount ratio when the predicted ammonia slip probability is larger than the slip probability of ammonia limiting operation of the LP-EGR system, limiting, by the controller, the operation of the LP-EGR when the absorption amount of ammonia is not larger than the value obtained by multiplying an ammonia absorption target amount by a minimum target absorption amount ratio, and dosing a urea solution, by the controller.

The method may further include comparing, by the controller, the ammonia absorption amount with a minimum ammonia absorption amount when the predicted ammonia slip probability is not larger than the slip probability of ammonia limiting operation of the LP-EGR system, and heating up the exhaust gas, by the controller, when the ammonia absorption amount is less than the minimum ammonia absorption amount.

The method may further include determining, by the controller, that operation of the LP-EGR system is limited when an absorption amount of ammonia is larger than a value obtained by multiplying the ammonia absorption target amount by the minimum target absorption amount ratio, and dosing the urea solution when the operation of the LP-EGR system is limited.

In the dosing the urea solution, the ammonia absorption amount may be a value obtained by multiplying the ammonia absorption target amount by a maximum target absorption amount ratio.

The slip probability of ammonia to the rear end of the SDPF may be predicted based on catalyst temperature, exhaust flow rate, nitrogen oxide (NOx) flow rate, ammonia absorption amount, and ammonia supply amount.

According to various aspects of the present invention, a system of purifying exhaust gas may include an engine including an injector for dosing fuel thereinto, generating power by burning mixture of air and the fuel, and exhausting the exhaust gas generated during a combustion process to the exterior of the engine through an exhaust pipe, a lean NOx trap (LNT) mounted on the exhaust pipe, and adapted to absorb nitrogen oxide (NOx) contained in the exhaust gas at a lean air/fuel ratio, to release the absorbed nitrogen oxide at a rich air/fuel ratio, and to reduce the nitrogen oxide contained in the exhaust gas or the released nitrogen oxide, a dosing module mounted on the exhaust pipe and adapted to dose reducing agent into the exhaust gas, a selective catalytic reduction catalyst on a diesel particulate filter (SDPF) mounted on the exhaust pipe downstream of the dosing module, and adapted to trap particulate matter contained in the exhaust gas and to reduce the nitrogen oxide contained in the exhaust gas using the reducing agent injected through the dosing module, and a controller controlling operation of a low pressure-exhaust gas recirculation (LP-EGR) system and dosing of urea solution by predicted probability of ammonia slip to a rear end of the SDPF and an ammonia absorption amount.

The system may further include a low pressure-exhaust gas recirculation (LP-EGR) system disposed between the engine and the LNT device.

The system may further include a mixer mounted on the exhaust pipe between the dosing module and the SDPF for mixing the reducing agent and the exhaust gas evenly.

The SDPF may further include an additional selective catalytic reduction catalyst (SCR) for reducing the nitrogen oxide contained in the exhaust gas using the reducing agent injected by the dosing module.

The controller may limit operation of the LP-EGR system and dose the urea solution in a driving condition that a slip probability of ammonia is above specific level, when the ammonia absorption amount is under specific level compared to required level.

The controller may heat up exhaust gas in a driving condition that a slip probability of ammonia is under a specific level, when the ammonia absorption amount is under specific level compared to required level.

The slip probability of ammonia to the SDPF may be predicted based on catalyst temperature, exhaust flow rate, nitrogen oxide flow rate, ammonia absorption amount, and ammonia supply amount.

According to various embodiments of the present invention, in the system of purifying exhaust gas having a LP-EGR system and an SDPF, purification efficiency may be improved through measurement and expectation of ammonia exhausted from rear end of the SDPF.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A system of purifying exhaust gas will be described below with reference to FIG. 1 and FIG. 2.

Figure 1:
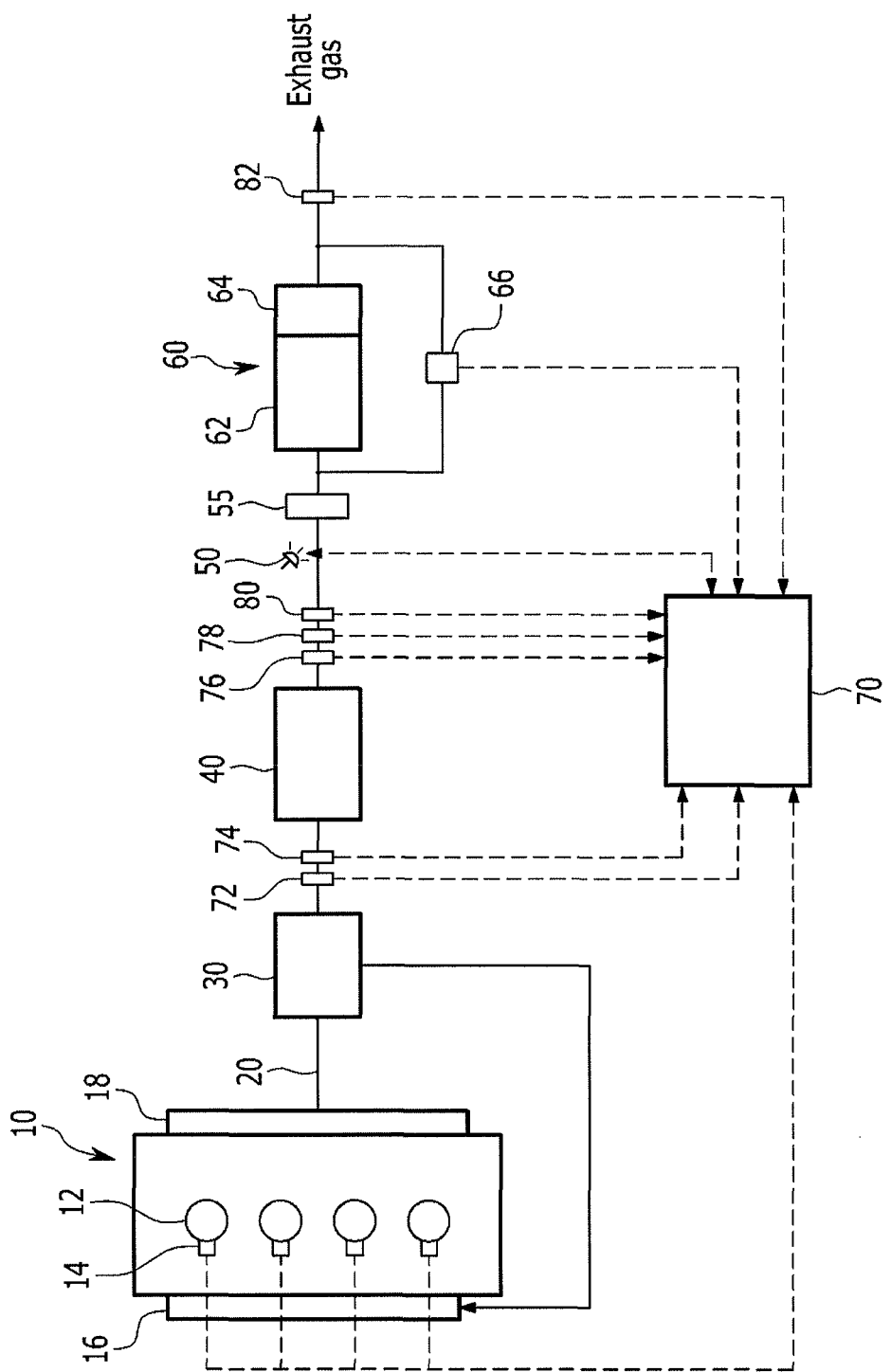
FIG. 1 is a schematic diagram of a system of purifying exhaust gas according to various embodiments of the present invention.
Figure 2:
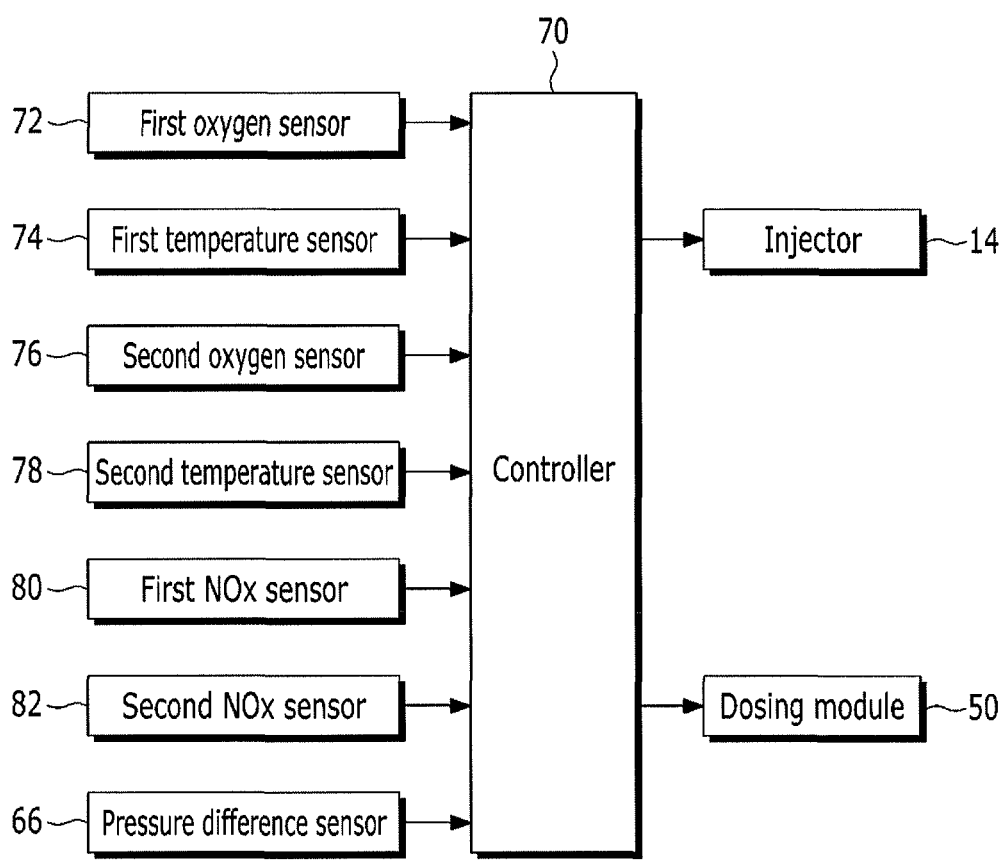
FIG. 2 is a block diagram illustrating a relationship of an input and output of a controller used in a method of purifying exhaust gas according to various embodiments of the present invention.

FIG. 1 is a schematic diagram of a system of purifying exhaust gas according to various embodiments of the present invention, and FIG. 2 is a block diagram illustrating a relationship of an input and output of a controller used in a method of purifying exhaust gas according to various embodiments of the present invention.

As shown in FIG. 1, an exhaust system for an internal combustion engine includes an engine 10, an exhaust pipe 20, an exhaust gas recirculation (EGR) apparatus 30, a lean NOx trap (LNT) 40, a dosing module 50, a particulate filter 60, and a controller 70.

The engine 10 burns air/fuel mixture in which fuel and air are mixed so as to convert chemical energy into mechanical energy. The engine 10 is connected to an intake manifold 16 so as to receive the air in a combustion chamber 12, and is connected to an exhaust manifold 18 such that exhaust gas generated in combustion process is gathered in the exhaust manifold 18 and is exhausted to the exterior. An injector 14 is mounted in the combustion chamber 12 so as to inject the fuel into the combustion chamber 12.

A diesel engine is exemplified herein, but a lean-burn gasoline engine may be used. In a case that the gasoline engine is used, the air/fuel mixture flows into the combustion chamber 12 through the intake manifold 16, and a spark plug is mounted at an upper portion of the combustion chamber 12. In addition, if a gasoline direct injection (GDI) engine is used, the injector 14 is mounted at the upper portion of the combustion chamber 12.

In addition, the engines having various compression ratios, preferably a compression ratio lower than or equal to 16.5, may be used.

The exhaust pipe 20 is connected to the exhaust manifold 18 so as to exhaust the exhaust gas to the exterior of a vehicle. The LNT 40, the dosing module 50, and the particulate filter 60 are mounted on the exhaust pipe 20 so as to remove hydrocarbon, carbon monoxide, particulate matter, and nitrogen oxide contained in the exhaust gas.

The low pressure-exhaust gas recirculation apparatus 30 is mounted on the exhaust pipe 20, and a portion of the exhaust gas exhausted from the engine 10 is supplied back to the engine 10 through the exhaust gas recirculation apparatus 30. In addition, the low pressure-exhaust gas recirculation apparatus 30 is connected to the intake manifold 16 so as to control combustion temperature by mixing a portion of the exhaust gas with the air. Such control of the combustion temperature is performed by controlling amount of the exhaust gas supplied back to the intake manifold 16 by control of the controller 70. Therefore, a recirculation valve controlled by the controller 70 may be mounted on a line connecting the low pressure-exhaust gas recirculation apparatus 30 and the intake manifold 16.

A first oxygen sensor 72 is mounted on the exhaust pipe 20 downstream of the low pressure-exhaust gas recirculation apparatus 30. The first oxygen sensor 72 detects oxygen amount in the exhaust gas passing through the low pressure-exhaust gas recirculation apparatus 30 and transmits a signal corresponding thereto to the controller 70 so as to help lean/rich control of the exhaust gas performed by the controller 70. In this specification, the detected value by the first oxygen sensor 72 is called air/fuel ratio (lambda) at an upstream of the LNT.

In addition, a first temperature sensor 74 is mounted on the exhaust pipe 20 downstream of the low pressure-exhaust gas recirculation apparatus 30 and detects temperature of the exhaust gas passing through the low pressure-exhaust gas recirculation apparatus 30.

The LNT 40 is mounted on the exhaust pipe 20 downstream of the low pressure-exhaust gas recirculation apparatus 30. The LNT 40 absorbs the nitrogen oxide (NOx) contained in the exhaust gas at a lean air/fuel ratio, and releases the absorbed nitrogen oxide and reduces the nitrogen oxide contained in the exhaust gas or the released nitrogen oxide at a rich air/fuel ratio. In addition, the LNT 40 may oxidize carbon monoxide (CO) and hydrocarbon (HC) contained in the exhaust gas.

Herein, the hydrocarbon represents all compounds including carbon and hydrogen contained in the exhaust gas and the fuel.

A second oxygen sensor 76, a second temperature sensor 78, and a first NOx sensor 80 are mounted on the exhaust pipe 20 downstream of the LNT 40.

The second oxygen sensor 76 detects oxygen amount contained in exhaust gas flowing into the particulate filter 60 and transmits a signal corresponding thereto to the controller 70. The controller 70 may perform the lean/rich control of the exhaust gas based on the detected values by the first oxygen sensor 72 and the second oxygen sensor 76. In this specification, the detected value by the second oxygen sensor 62 is called air/fuel ratio (lambda) at an upstream of the filter.

The second temperature sensor 78 detects temperature of the exhaust gas flowing into the particulate filter 60 and transmits a signal corresponding thereto to the controller 70.

The first NOx sensor 80 detects NOx amount contained in the exhaust gas flowing into the particulate filter 60 and transmits a signal corresponding thereto to the controller 70. The NOx amount detected by the first NOx sensor 80 may be used to determine amount of reducing agent injected by the dosing module 50.

The dosing module 50 is mounted on the exhaust pipe 20 upstream of the particulate filter 60 and injects the reducing agent into the exhaust gas by control of the controller 70. Typically, the dosing module 50 injects urea and the injected urea is hydrolyzed and converted into ammonia. However, the reducing agent is not limited to the ammonia. For convenience of explanation, it is exemplified hereinafter that the ammonia is used as the reducing agent and the dosing module 50 injects the urea. However, it is to be understood that the reducing agent other than the ammonia is also included within the scope of various embodiments of the present invention without changing the spirit of the various embodiments of the present invention.

A mixer 55 is mounted on the exhaust pipe 20 downstream of the dosing module 50 and mixes the reducing agent and the exhaust gas evenly.

The particulate filter 60 is mounted on the exhaust pipe 20 downstream of the mixer 55, traps particulate matter contained in the exhaust gas, and reduces the nitrogen oxide contained in the exhaust gas using the reducing agent injected by the dosing module 50. For these purposes, the particulate filter 60 includes a selective catalytic reduction catalyst on a diesel particulate filter (SDPF) 62 and an additional selective catalytic reduction catalyst (SCR) 64.

The SDPF 62 is formed by coating the SCR on walls defining channels of the DPF. Generally, the DPF includes a plurality of inlet channels and outlet channels. Each of the inlet channels includes an end that is open and the other end that is blocked, and receives the exhaust gas from a front end of the DPF. In addition, each of the outlet channels includes an end that is blocked and the other end that is open, and discharges the exhaust gas from the DPF. The exhaust gas flowing into the DPF through the inlet channels enters the outlet channels through porous walls separating the inlet channels and the outlet channels. After that, the exhaust gas is discharged from the DPF through the outlet channels. When the exhaust gas passes through the porous walls, the particulate matter contained in the exhaust gas is trapped. In addition, the SCR coated on the SDPF 62 reduces the nitrogen oxide contained in the exhaust gas using the reducing agent injected by the dosing module 50.

The additional SCR 64 is mounted at the rear of the SDPF 62. The additional SCR 64 further reduces the nitrogen oxide if the SDPF 62 purifies the nitrogen oxide completely.

Meanwhile, a pressure difference sensor 66 is mounted on the exhaust pipe 20. The pressure difference sensor 66 detects pressure difference between a front end portion and a rear end portion of the particulate filter 60, and transmits a signal corresponding thereto to the controller 70. The controller 70 may control the particulate filter 60 to be regenerated if the pressure difference detected by the pressure difference sensor 66 is greater than a predetermined pressure. In this case, the injector 14 post-injects the fuel so as to burn the particulate matter trapped in the particulate filter 60.

In addition, a second NOx sensor 82 is mounted on the exhaust pipe 20 downstream of the particulate filter 60. The second NOx sensor 82 detects amount of the nitrogen oxide contained in the exhaust gas exhausted from the particulate filter 60, and transmits a signal corresponding thereto to the controller 70. The controller 70 can check based on the detected value by the second NOx sensor 82 whether the nitrogen oxide contained in the exhaust gas is normally removed in the particulate filter 60. That is, the second NOx sensor 82 may be used to evaluate performance of the particulate filter 60.

Meanwhile, the controller 70 controls operation of the LP-EGR system 30 and dosing of urea solution by predicted probability of ammonia slip to rear end of the SDPF 62 and ammonia absorption amount.

Further, the controller 70 limits operation of the LP-EGR system 30 and doses urea in a driving condition that slip probability of ammonia is above specific level, when ammonia absorption amount is under specific level compared to required level.

Further, the controller 70 heats up exhaust gas in a driving condition that slip probability of ammonia is under specific level, when ammonia absorption amount is under specific level compared to required level.

Meanwhile, the slip probability of ammonia to the SDPF 62 may is predicted by considering catalyst temperature, exhaust flow rate, nitrogen oxide flow rate, ammonia absorption amount, and ammonia supply amount.

Referring to FIG. 2, the first oxygen sensor 72, the first temperature sensor 74, the second oxygen sensor 76, the second temperature sensor 78, the first NOx sensor 80, the second NOx sensor 82, and the pressure difference sensor 66 are electrically connected to the controller 70, and transmit the detected values to the controller 70.

The first oxygen sensor 72 detects the oxygen amount in the exhaust gas passing through the exhaust gas recirculation apparatus 30 and transmits the signal corresponding thereto to the controller 70. The controller 70 may perform the lean/rich control of the exhaust gas based on the oxygen amount in the exhaust gas detected by the first oxygen sensor 72. The detected value by the first oxygen sensor 72 may be represented as lambda (λ). The lambda means a ratio of actual air amount to stoichiometric air amount. If the lambda is greater than 1, the air/fuel ratio is lean. On the contrary, the air/fuel ratio is rich if the lambda is smaller than 1.

The first temperature sensor 74 detects the temperature of the exhaust gas passing through the exhaust gas recirculation apparatus 30 and transmits the signal corresponding thereto to the controller 70.

The second oxygen sensor 76 detects the oxygen amount in the exhaust gas flowing into the particulate filter 60 and transmits the signal corresponding thereto to the controller 70.

The second temperature sensor 78 detects the temperature of the exhaust gas flowing into the particulate filter 60 and transmits the signal corresponding thereto to the controller 70.

The first NOx sensor 80 detects the NOx amount contained in the exhaust gas flowing into the particulate filter 60 and transmits the signal corresponding thereto to the controller 70.

The second NOx sensor 82 detects the NOx amount contained in the exhaust gas exhausted from the particulate filter 60 and transmits the signal corresponding thereto to the controller 70.

The pressure difference sensor 66 detects the pressure difference between a front end portion and a rear end portion of the particulate filter 60 and transmits the signal corresponding thereto to the controller 70.

The controller 70 determines the driving condition of the engine, fuel injection amount, fuel injection timing, fuel injection pattern, injection amount of the reducing agent, regeneration timing of the particulate filter 60, and desulfurization timing of the LNT 40 based on the transmitted value, and outputs a signal for controlling the injector 14 and the dosing module 50 to the injector 14 and the dosing module 50.

Meanwhile, a plurality of sensors other than the sensors illustrated in FIG. 2 may be mounted in the system of purifying exhaust gas according to various embodiments of the present invention. For better comprehension and ease of description, however, description of the plurality of sensors will be omitted.

Figure 3:
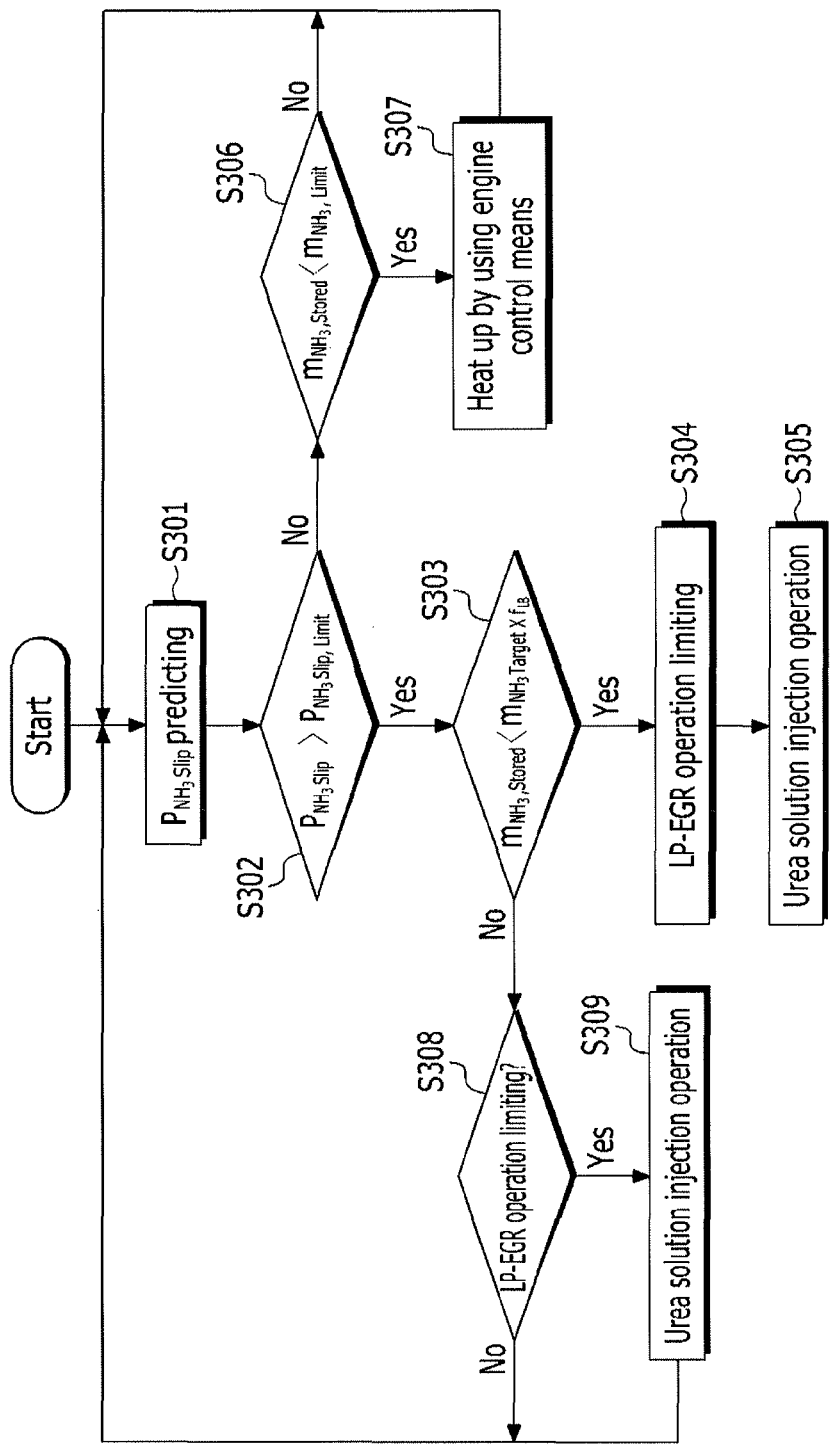
FIG. 3 is a flowchart of a method of purifying exhaust gas according to various embodiments of the present invention.

FIG. 3 is a flowchart of a method of purifying exhaust gas according to various embodiments of the present invention.

Referring to FIG. 3, firstly, a slip probability ($P_{NH3Slip}$) of ammonia (NH3) to the rear end of a selective catalytic reduction on diesel particulate filter (SDPF) 62 is predicted S301. The slip probability ($P_{NH3Slip}$) of ammonia to the rear end of the SDPF 62 is predicted based on catalyst temperature, exhaust flow rate, nitrogen oxide (NOx) flow rate, ammonia absorption amount, and ammonia supply amount.

Next, the predicted ammonia slip probability ($P_{NH3Slip}$) and a slip probability ($P_{NH3Slip, Limit}$) of ammonia limiting operation of a low pressure-exhaust gas recirculation (LP-EGR) system are compared with each other S302.

Next, an absorption amount ($m_{NH3, Stored}$) of ammonia and a value obtained by multiplying an ammonia absorption target amount ($m_{NH3, Target}$) by a minimum target absorption amount ratio ($f_{LB}$) are compared with each other if the predicted ammonia slip probability ($P_{NH3Slip}$) is larger than the slip probability ($P_{NH3Slip, Limit}$) of ammonia limiting operation of the LP-EGR system S303.

Next, the operation of the LP-EGR 30 is limited if the absorption amount ($m_{NH3, Stored}$) of ammonia is not larger than the value obtained by multiplying an ammonia absorption target amount ($m_{NH3, Target}$) by a minimum target absorption amount ratio ($f_{LB}$) S304, and a urea solution is injected S305.

Meanwhile, the ammonia absorption amount ($m_{NH3, Stored}$) and a minimum ammonia absorption amount ($m_{NH3, Limit}$) are compared with each other if the predicted ammonia slip probability ($P_{NH3Slip}$) is not larger than the slip probability ($P_{NH3Slip, Limit}$) of ammonia limiting operation of the LP-EGR system S306, and the exhaust gas is heated up if the ammonia absorption amount ($m_{NH3, Stored}$) is less than the minimum ammonia absorption amount ($m_{NH3, Limit}$) S307.

Further, it is determined whether operation of the LP-EGR system is limited if an absorption amount of ammonia ($m_{NH3, Stored}$) is larger than the value obtained by multiplying an ammonia absorption target amount ($m_{NH3, Target}$) by a minimum target absorption amount ratio ($f_{LB}$) S308, and the urea solution is injected if the operation of the LP-EGR system 30 is limited S309.

At this time, the ammonia absorption amount ($m_{NH3, Stored}$) may be a value obtained by multiplying an ammonia absorption target amount ($m_{NH3, Target}$) by a maximum target absorption amount ratio ($f_{UB}$).

According to various embodiments of the present invention, in the system of purifying exhaust gas having a LP-EGR system and an SDPF, purification efficiency may be improved through measurement and expectation of ammonia exhausted from rear end of the SDPF.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of purifying exhaust gas, comprising:
   predicting, by a controller, a slip probability of ammonia (NH3) to a rear end of a selective catalytic reduction on diesel particulate filter (SDPF);
   comparing, by the controller, the predicted ammonia slip probability with a slip probability of ammonia limiting operation of a low pressure-exhaust gas recirculation (LP-EGR) system;
   comparing, by the controller, an absorption amount of ammonia with a value obtained by multiplying an ammonia absorption target amount by a minimum target absorption amount ratio when the predicted ammonia slip probability is larger than the slip probability of ammonia limiting operation of the LP-EGR system;
   limiting, by the controller, the operation of the LP-EGR when the absorption amount of ammonia is not larger than the value obtained by multiplying an ammonia absorption target amount by a minimum target absorption amount ratio; and dosing a urea solution, by the controller.

2. The method of claim 1, further comprising:

comparing, by the controller, the ammonia absorption amount with a minimum ammonia absorption amount when the predicted ammonia slip probability is not larger than the slip probability of ammonia limiting operation of the LP-EGR system; and heating up the exhaust gas, by the controller, when the ammonia absorption amount is less than the minimum ammonia absorption amount.

3. The method of claim 1, further comprising:

determining, by the controller, that operation of the LP-EGR system is limited when an absorption amount of ammonia is larger than a value obtained by multiplying the ammonia absorption target amount by the minimum target absorption amount ratio; and dosing the urea solution when the operation of the LP-EGR system is limited.

4. The method of claim 3, wherein in the dosing the urea solution, the ammonia absorption amount is a value obtained by multiplying the ammonia absorption target amount by a maximum target absorption amount ratio.

5. The method of claim 1, wherein the slip probability of ammonia to the rear end of the SDPF is predicted based on catalyst temperature, exhaust flow rate, nitrogen oxide (NOx) flow rate, ammonia absorption amount, and ammonia supply amount.

6. A system of purifying exhaust gas, comprising:

an engine including an injector for dosing fuel thereinto, generating power by burning mixture of air and the fuel, and exhausting the exhaust gas generated during a combustion process to the exterior of the engine through an exhaust pipe;

a lean NOx trap (LNT) mounted on the exhaust pipe, and configured to absorb nitrogen oxide (NOx) contained in the exhaust gas at a lean air/fuel ratio, to release the absorbed nitrogen oxide at a rich air/fuel ratio, and to reduce the nitrogen oxide contained in the exhaust gas or the released nitrogen oxide;

a dosing device mounted on the exhaust pipe and configured to dose reducing agent into the exhaust gas;

a selective catalytic reduction catalyst on a diesel particulate filter (SDPF) mounted on the exhaust pipe downstream of the dosing device, and configured to trap particulate matter contained in the exhaust gas and to reduce the nitrogen oxide contained in the exhaust gas using the reducing agent injected through the dosing device; and a controller controlling operation of a low pressure-exhaust gas recirculation (LP-EGR) system and dosing of urea solution by predicted probability of ammonia slip to a rear end of the SDPF and an ammonia absorption amount.

7. The system of claim 6, further comprising a low pressure-exhaust gas recirculation (LP-EGR) system disposed between the engine and the LNT device.

8. The system of claim 6, further comprising a mixer mounted on the exhaust pipe between the dosing device and the SDPF for mixing the reducing agent and the exhaust gas evenly.

9. The system of claim 6, wherein the SDPF further comprise an additional selective catalytic reduction catalyst (SCR) for reducing the nitrogen oxide contained in the exhaust gas using the reducing agent injected by the dosing device.

10. The system of claim 6, wherein the controller limits operation of the LP-EGR system and doses the urea solution in a driving condition that a slip probability of ammonia is above specific level, when the ammonia absorption amount is under specific level compared to required level.

11. The system of claim 6, wherein the controller heats up exhaust gas in a driving condition that a slip probability of ammonia is under a specific level, when the ammonia absorption amount is under specific level compared to required level.

12. The system of claim 6, wherein the slip probability of ammonia to the SDPF is predicted based on catalyst temperature, exhaust flow rate, nitrogen oxide flow rate, ammonia absorption amount, and ammonia supply amount.

* * * * *